(12) United States Patent
Duan et al.

(10) Patent No.: US 11,347,334 B2
(45) Date of Patent: May 31, 2022

(54) ARRAY SUBSTRATE, METHOD FOR FABRICATING THE SAME, AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Cenhong Duan, Beijing (CN); Dawei Shi, Beijing (CN); Fengguo Wang, Beijing (CN); Feng Li, Beijing (CN); Hong Liu, Beijing (CN); Xinguo Wu, Beijing (CN); Lu Yang, Beijing (CN); Wentao Wang, Beijing (CN); Zifeng Wang, Beijing (CN); Bo Ma, Beijing (CN); Yuanbo Li, Beijing (CN); Zhixuan Guo, Beijing (CN); Jing Zhao, Beijing (CN); Haiqin Liang, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 471 days.

(21) Appl. No.: 16/471,393

(22) PCT Filed: Dec. 4, 2018

(86) PCT No.: PCT/CN2018/119147
§ 371 (c)(1),
(2) Date: Jun. 19, 2019

(87) PCT Pub. No.: WO2019/184427
PCT Pub. Date: Oct. 3, 2019

(65) Prior Publication Data
US 2021/0373689 A1 Dec. 2, 2021

(30) Foreign Application Priority Data

Mar. 30, 2018 (CN) .......................... 201810294475.4

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 2203/04103* (2013.01)

(58) Field of Classification Search
None
See application file for complete search history.

(56) References Cited

U.S. PATENT DOCUMENTS

2015/0160767 A1 6/2015 Song et al.
2016/0118420 A1* 4/2016 Yang ..................... H01L 27/124
257/40

(Continued)

FOREIGN PATENT DOCUMENTS

CN 104808403 A 7/2015
CN 105487718 A 4/2016

(Continued)

OTHER PUBLICATIONS

ISR for counterpart PCT/CN2018/119147 dated Mar. 7, 2019.
Office Action for CN 201810294475.4 dated Nov. 28, 2019.

*Primary Examiner* — Duane N Taylor, Jr.
(74) *Attorney, Agent, or Firm* — ArentFox Schiff LLP; Michael Fainberg (57) ABSTRACT

An array substrate, a method for fabricating the same, and a display device are provided. The array substrate includes: a base substrate; touch electrode wiring including a first conductive layer and a second conductive layer, where the first conductive layer is between the base substrate and the second conductive layer, the second conductive layer (Continued)

includes at least one first via hole to expose the first conductive layer, and the first conductive layer has a higher electrical conductivity than that of the second conductive layer; a planarization layer on the second conductive layer, where the planarization layer includes at least one first touch electrode contact hole; and touch electrode on the planarization layer, where the touch electrode is connected with the first conductive layer through the first touch electrode contact hole and the first via hole.

17 Claims, 6 Drawing Sheets

(56) References Cited

U.S. PATENT DOCUMENTS

| | | |
|---|---|---|
| 2016/0328074 A1 | 11/2016 | Peng et al. |
| 2017/0010734 A1* | 1/2017 | Liu .................. H01L 51/56 |
| 2017/0222059 A1 | 8/2017 | Chen et al. |
| 2021/0210559 A1* | 7/2021 | Chen ................. H01L 51/56 |

FOREIGN PATENT DOCUMENTS

| | | |
|---|---|---|
| CN | 105824482 A | 8/2016 |
| CN | 106020581 A | 10/2016 |
| CN | 106445261 A | 2/2017 |
| CN | 106876417 A | 6/2017 |
| CN | 108509082 A | 9/2018 |
| JP | 2008083899 A | 4/2008 |

\* cited by examiner

ARRAY SUBSTRATE, METHOD FOR FABRICATING THE SAME, AND DISPLAY DEVICE

This disclosure is a US National Stage of International Application No. PCT/CN2018/119147, filed Dec. 4, 2018, which claims priority to Chinese Patent Application No. 201810294475.4, filed with the Chinese Patent Office on Mar. 30, 2018, and entitled "Array substrate, Method for fabricating the same, and Display device", which is hereby incorporated by reference in its entirety.

FIELD

This disclosure relates to the field of display technologies, and particularly to an array substrate, a method for fabricating the same, and a display device.

BACKGROUND

At present, in an all-in-cell touch panel, touch metal wiring is arranged in thin film transistors, and touch electrodes are coupled with drains. In a display period, the touch electrodes and pixel electrodes constitute capacitors for displaying; and in a touch period, the touch electrodes are configured for touching. However the touch panel in the prior art tends to suffer from being stuck, a poor touch, etc.

SUMMARY

An embodiment of this disclosure provides an array substrate. The array substrate includes: a base substrate; touch electrode wiring comprising a first conductive layer and a second conductive layer, wherein the first conductive layer is between the base substrate and the second conductive layer, the second conductive layer includes at least one first via hole to expose the first conductive layer, and the first conductive layer has a higher electrical conductivity than that of the second conductive layer; a planarization layer on the side of the second conductive layer away from the base substrate, wherein the planarization layer includes at least one first touch electrode contact hole, and an orthographic projection of the first touch electrode contact hole on the base substrate covers an orthographic projection of the first via hole on the base substrate; and at least one touch electrode on the side of the planarization layer away from the base substrate, wherein the touch electrode is connected with the first conductive layer through the first touch electrode contact hole and the first via hole.

Optionally in the array substrate according to the embodiment of this disclosure, the first conductive layer includes at least one groove, wherein an orthographic projection of the groove on the base substrate overlaps with the orthographic projection of the first via hole on the base substrate.

Optionally in the array substrate according to the embodiment of this disclosure, the array substrate further includes: a first passivation layer between the touch electrode and the planarization layer, wherein the first passivation layer includes at least one second touch electrode contact hole; an area of an orthographic projection of the second touch electrode contact hole on the base substrate is smaller than an area of the orthographic projection of the first touch electrode contact hole on the base substrate; and the touch electrode is connected with the first conductive layer through the first touch electrode contact hole, the second touch electrode contact hole, and the first via hole.

Optionally in the array substrate according to the embodiment of this disclosure, the array substrate further includes at least one driver transistor for driving at least one pixel electrode, wherein: the touch electrode wiring is arranged at a same layer as the driver transistor and insulated from source and drain electrodes of the driver transistor.

Optionally in the array substrate according to the embodiment of this disclosure, the second conductive layer further includes at least one second via hole, and the planarization layer further includes at least one first pixel electrode contact hole, wherein an orthographic projection of the first pixel electrode contact hole on the base substrate covers an orthographic projection of the second via hole on the base substrate.

Optionally in the array substrate according to the embodiment of this disclosure, the array substrate further includes a touch electrode block at least located in the second via hole, wherein the touch electrode block is arranged at a same layer as the touch electrode.

Optionally in the array substrate according to the embodiment of this disclosure, the first passivation layer further includes at least one second pixel electrode contact hole, wherein: an area of an orthographic projection of the second pixel electrode contact hole on the base substrate is smaller than the area of the orthographic projection of the first pixel electrode contact hole on the base substrate; and the pixel electrode is connected with the touch electrode block through the first pixel electrode contact hole, the second pixel electrode contact hole, and the second via hole.

Optionally in the array substrate according to the embodiment of this disclosure, the array substrate further includes a second passivation layer between the touch electrode and the pixel electrode, wherein an orthographic projection of the second passivation layer on the base substrate does not overlap with the orthographic projection of the first pixel electrode contact hole on the base substrate.

An embodiment of this disclosure further provides a display device including the array substrate according to the embodiment of this disclosure.

An embodiment of this disclosure provides a method for fabricating an array substrate. The array substrate includes: preparing a base substrate; forming touch electrode wiring on the base substrate, the touch electrode wiring including a first conductive layer and a second conductive layer, wherein the first conductive layer is between the base substrate and the second conductive layer, the second conductive layer includes at least one first via hole to expose the first conductive layer, and the first conductive layer has a higher electrical conductivity than that of the second conductive layer; forming a planarization layer on the side of the second conductive layer away from the base substrate, wherein the planarization layer includes at least one first touch electrode contact hole, and an orthographic projection of the first touch electrode contact hole on the base substrate covers an orthographic projection of the first via hole on the base substrate; and forming at least one touch electrode on the side of the planarization layer away from the base substrate, wherein the touch electrode is connected with the first conductive layer through the first touch electrode contact hole and the first via hole.

Optionally in the method for fabricating an array substrate according to the embodiment of this disclosure, before the touch electrode is formed, the method further includes: forming a first passivation layer on the side of the planarization layer away from the base substrate, wherein the first passivation layer includes at least one second touch electrode contact hole; the area of the orthographic projection of the second touch electrode contact hole on the base substrate is smaller than the area of the orthographic projection of the first touch electrode contact hole on the base substrate; and the touch electrode is connected with the first conductive layer through the first touch electrode contact hole, the second touch electrode contact hole, and the first via hole.

Optionally in the method for fabricating an array substrate according to the embodiment of this disclosure, after the first touch electrode contact hole is formed, the method further includes: removing the second conductive layer in position corresponding to the first touch electrode contact hole to form the first via hole to expose the first conductive layer.

Optionally in the method for fabricating an array substrate according to the embodiment of this disclosure, when the first touch electrode contact hole is formed in the planarization layer, the method further includes: forming at least one first pixel electrode contact hole in the planarization layer in the same patterning process as the first touch electrode contact hole.

Optionally in the method for fabricating an array substrate according to the embodiment of this disclosure, after the first pixel electrode contact hole is formed, the method further includes: removing the second conductive layer in position corresponding to the first pixel electrode contact hole to form the second via hole to expose the first conductive layer.

Optionally in the method for fabricating an array substrate according to the embodiment of this disclosure, when the touch electrode is formed on the side of the planarization layer away from the base substrate, the method further includes: forming a touch electrode block in the second via hole in the same patterning process as the touch electrode.

Optionally in the method for fabricating an array substrate according to the embodiment of this disclosure, after the touch electrode is formed on the side of the planarization layer away from the base substrate, the method further includes: forming a second passivation layer on the side of the touch electrode away from the base substrate, wherein an orthographic projection of the second passivation layer on the base substrate does not overlap with the orthographic projection of the first pixel electrode contact hole on the base substrate.

Optionally in the method for fabricating an array substrate according to the embodiment of this disclosure, after the second passivation layer is formed on the side of the touch electrode away from the base substrate, the method further includes: forming at least one pixel electrode on the side of the second passivation layer away from the base substrate, wherein the pixel electrode is connected with the touch electrode block through the first pixel electrode contact hole.

DETAILED DESCRIPTION

Exemplary embodiments of this disclosure will be described below in further details with reference to the drawings. However the exemplary embodiments can be implemented in a number of forms, and shall not be construed as being limited to the examples here; and on the contrary, these embodiments are provided to make this disclosure more comprehensive and complete, and to convey the idea of the exemplary embodiments completely to those skilled in the art. The features, structures, or characteristics described here can be combined as appropriate in one or more embodiments. Particular details will be set forth in the following description to facilitate full understanding of the embodiments of this disclosure. However those skilled in the art shall appreciate that the technical solutions of this disclosure can be implemented without requiring one or more of the particular details, or can be implemented in other methods, components, devices, steps, etc. A repeated description or illustration of those aspects well known in the art will be omitted here so as not to obscure this disclosure.

Furthermore the drawings are only illustrative of this disclosure, but may not necessarily be drawn to scale. Like or similar reference numerals throughout the drawings will refer to like or similar components, so a repeated description thereof will be omitted here.

Figure 1:
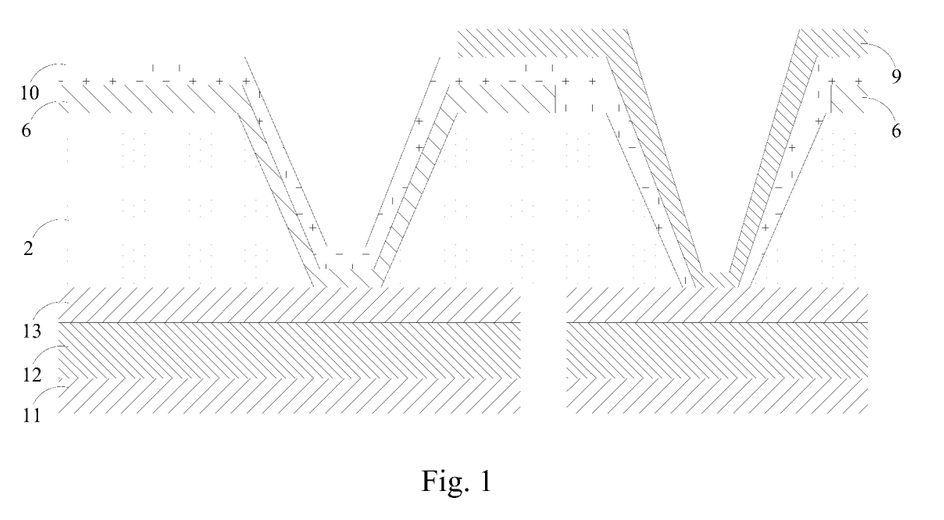
FIG. 1 is a schematic structural diagram of the all-in-cell array substrate in the related art.

FIG. 1 illustrates a schematic structural diagram of the all-in-cell array substrate in the related art. The array substrate includes touch electrode wiring located on a base substrate (the touch electrode wiring include a first conductive layer 12, a second conductive layer 13, and a third conductive layer 11), where a planarization layer 2 is arranged on the second conductive layer 13, and at least one touch electrode contact hole and at least one pixel electrode contact hole are arranged in the planarization layer 2. The touch electrodes 6 are arranged on the planarization layer 2, and contact and are connected with the second conductive layer 13 through the touch electrode contact holes. A passivation layer 10 is arranged on the touch electrodes 6, and pixel electrodes 9 are arranged on the passivation layer 10, and contact and are connected with the second conductive layer 13 through the pixel electrode contact holes. In the display period, the touch electrodes 6 and the pixel electrodes 9 constitute capacitors for displaying; and in the touch period, the touch electrodes 6 are configured for touching. However in the structure of the touch electrode wiring in the related art (the first conductive layer is generally a signal transmission layer, and the second conductive layer and the third conductive layer generally protect and support the first conductive layer), there is such a high contact resistance between the second conductive layer and the first conductive layer that the touch panel tends to suffer from being stuck, a poor touch, etc., in the touch period.

The embodiments of this disclosure provide an array substrate, a method for fabricating the same, and a display device including the array substrate, so as to address the problems in the related art that the touch panel tends to suffer from being stuck, a poor touch, etc., in the touch period.

Figure 2:
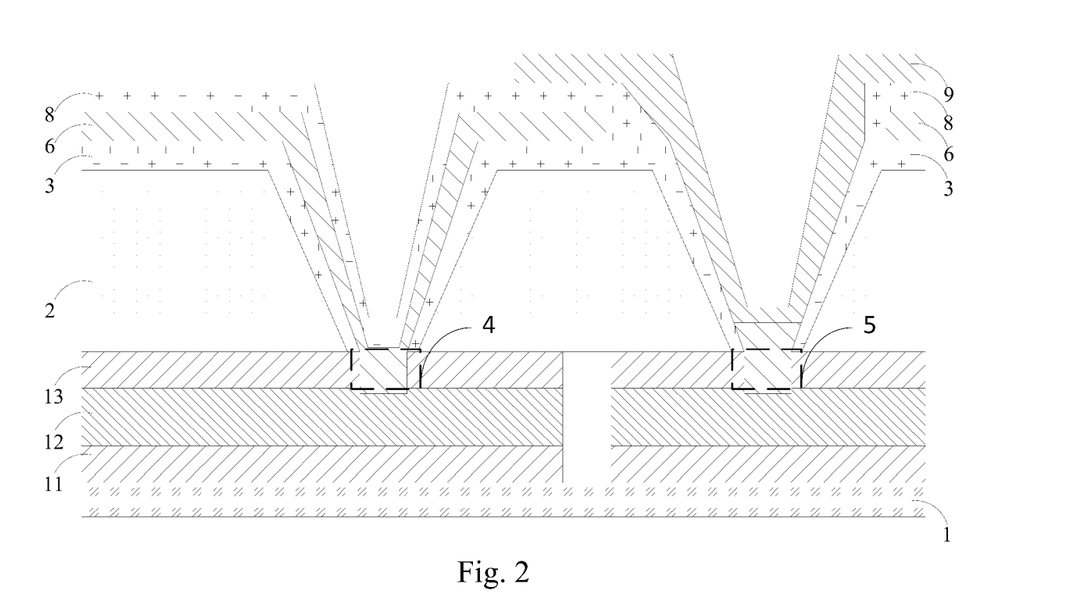
FIG. 2 is a schematic structural diagram of an array substrate according to an embodiment of this disclosure.
Figure 4:
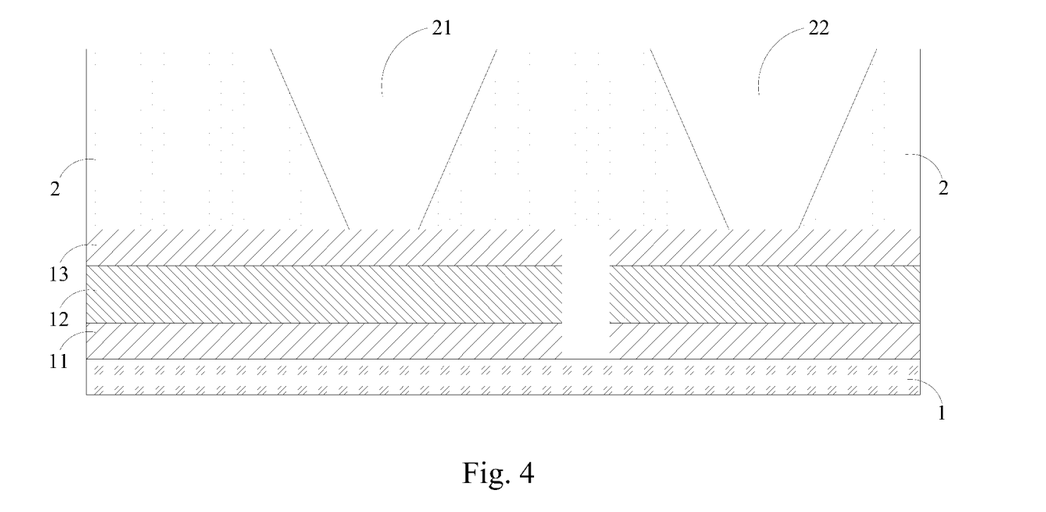
FIG. 4 is a schematic structural diagram after forming a planarization layer on the basis of FIG. 3.

As illustrated in FIG. 2, an embodiment of this disclosure provides an array substrate. The array substrate includes: a base substrate 1; touch electrode wiring including a first conductive layer 12 and a second conductive layer 13, where the first conductive layer 12 is located between the base substrate 1 and the second conductive layer 13, the second conductive layer 13 includes at least one first via hole 4 to expose the first conductive layer 12, and the first conductive layer 12 has a higher electrical conductivity than that of the second conductive layer 13; a planarization layer 2 located on the side of the second conductive layer 13 away from the base substrate 1, where the planarization layer 2 includes at least one first touch electrode contact hole 21 (as illustrated in FIG. 4), and the orthographic projection of the first touch electrode contact hole 21 on the base substrate 1 covers the orthographic projection of the first via hole 4 on the base substrate 1; and at least one touch electrode 6 located on the side of the planarization layer 2 away from the base substrate, where the touch electrode 6 is connected with the first conductive layer 12 through the first touch electrode contact hole 21 and the first via hole 4.

Specifically in the array substrate according to the embodiment of this disclosure, the array substrate includes: a base substrate; touch electrode wiring including a first conductive layer and a second conductive layer, where the first conductive layer is located between the base substrate and the second conductive layer, the second conductive layer includes first via holes to expose the first conductive layer, and the first conductive layer has a higher electrical conductivity than that of the second conductive layer; a planarization layer located on the side of the second conductive layer away from the base substrate, where the planarization layer includes a first touch electrode contact hole, and the orthographic projection of the first touch electrode contact hole on the base substrate covers orthographic projection of the first via hole on the base substrate; and touch electrode located on the side of the planarization layer away from the base substrate, where the touch electrode is connected with the first conductive layer through the first touch electrode contact hole and the first via hole. In the structure of the array substrate above, the touch electrode can directly contact with the first conductive layer, and since the first conductive layer has a high electrical conductivity than that of the second conductive layer, the touch electrode can directly contact with the first conductive layer to thereby lower a contact resistance between the touch electrode and the first conductive layer so as to avoid in effect a touch panel from being stuck, a poor touch from occurring, etc., in a touch period. Moreover the contact resistance can be lowered to thereby alleviate heat from being generated in the touch panel, so as to prolong the lifetime of the product, to save energy, and to reduce contamination emission.

The array substrate according to this embodiment will be described below in further details.

Optionally in the array substrate according to the embodiment of this disclosure, the first conductive layer includes at least one groove.

The orthographic projection of the groove on the base substrate overlaps with the orthographic projection of the first via hole on the base substrate.

Specifically in the array substrate according to the embodiment of this disclosure, in order to enable the touch electrode to be in good contact with the first conductive layer, after the second conductive layer is removed, a part of the first conductive layer can also be removed to form the at least one groove, to thereby avoid the remaining second conductive layer from affecting the contact between the touch electrode and the first conductive layer. Accordingly the second conductive layer can be removed by a thickness more than or equal to the thickness of the second conductive layer.

Optionally in the array substrate according to the embodiment of this disclosure, the array substrate further includes a driver transistor for driving pixel electrode.

The touch electrode wiring is arranged at the same layer as the source and drain electrodes of the driver transistor and insulated from source and drain electrodes of the driver transistor.

Figure 3:
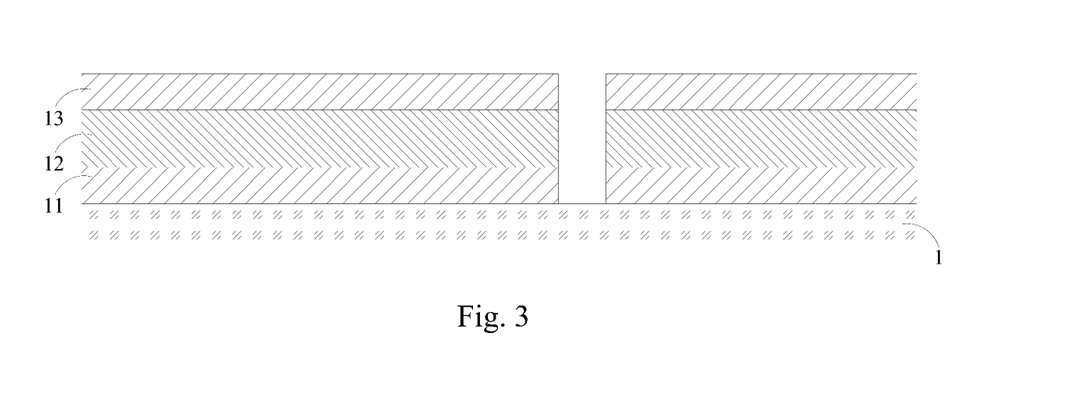
FIG. 3 is a schematic structural diagram of touch electrode wiring, and source-drain electrodes formed on a base substrate in the array substrate according to the embodiment of this disclosure.

Specifically in the array substrate according to the embodiment of this disclosure, as illustrated in FIG. 3, the array substrate further includes a third conductive layer 11 in addition to the first conductive layer 12 and the second conductive layer 13, where the third conductive layer 11, the first conductive layer 12, and the second conductive layer 13 can include the source-drain electrodes, and the touch electrode wiring insulated from each other, but arranged at the same layer. The third conductive layer 11 is arranged on the base substrate 1, the first conductive layer 12 is arranged on the third conductive layer 11, the second conductive layer 13 is located on the side of the first conductive layer 12 away from the base substrate 1, and the first conductive layer 12 has a higher electrical conductivity than that of the second conductive layer 13.

It shall be noted that in the array substrate according to the embodiment of this disclosure, both the materials of the third conductive layer 11 and the second conductive layer 13 can be made of titanium, which is transition metal in silvery white with low thermal and electrical conductivities. The material of the first conductive layer 12 can be aluminum with a higher electrical conductivity than that of titanium. The materials of the third conductive layer 11, the first conductive layer 12, and the second conductive layer 13 will not be limited thereto. For example, the material of the first conductive layer 12 can alternatively be doped with Indium Tin Oxide (ITO), silver, copper, or another material with a high electrical conductivity, where the ITO has a high electrical conductivity, a high transmittivity to visible light, a high mechanical rigidity, and high chemical stability; and the materials of the third conductive layer 11 and the second conductive layer 13 can alternatively be molybdenum.

Specifically in the array substrate according to the embodiment of this disclosure, as illustrated in FIG. 4, the planarization layer 2 is arranged on the second conductive layer 13, and the planarization layer 2 includes at least one first touch electrode contact hole 21 and at least one first pixel electrode contact hole 22.

The planarization layer 2 can protect the second conductive layer 13, and can make the surface of the third conductive layer 13 planar to thereby enable another layer to be arranged conveniently thereon. In the embodiment of this disclosure, the first touch electrode contact hole 21 and the first pixel electrode contact hole 22 can be formed in a photolithograph process. The planarization layer 2 can be an inorganic insulation film, e.g., silicon nitride, silicon oxide, etc., or an organic insulation film, e.g., a resin material.

Optionally in the array substrate according to the embodiment of this disclosure, as illustrated in FIG. 2 and FIG. 4, the second conductive layer 13 further includes at least one second via hole 5, and the planarization layer 2 further includes at least one first pixel electrode contact hole 22 (as illustrated in FIG. 4).

The orthographic projection of the first pixel electrode contact hole 22 on the base substrate 1 covers the orthographic projection of the second via hole 2 on the base substrate 1.

Specifically in the array substrate according to the embodiment of this disclosure, since the touch electrode wiring is arranged at the same layer as the source and drain electrodes of the driver transistor, in order to enable the pixel electrode to contact with the source-drain electrodes, the first pixel electrode contact hole shall be arranged in the planarization layer, and the second via hole can be arranged in the second conductive layer so that pixel electrode can directly contact with the first conductive layer to thereby lower a contact resistance between the pixel electrode and the source-drain electrode, so as to better transmit a signal.

Figure 5:
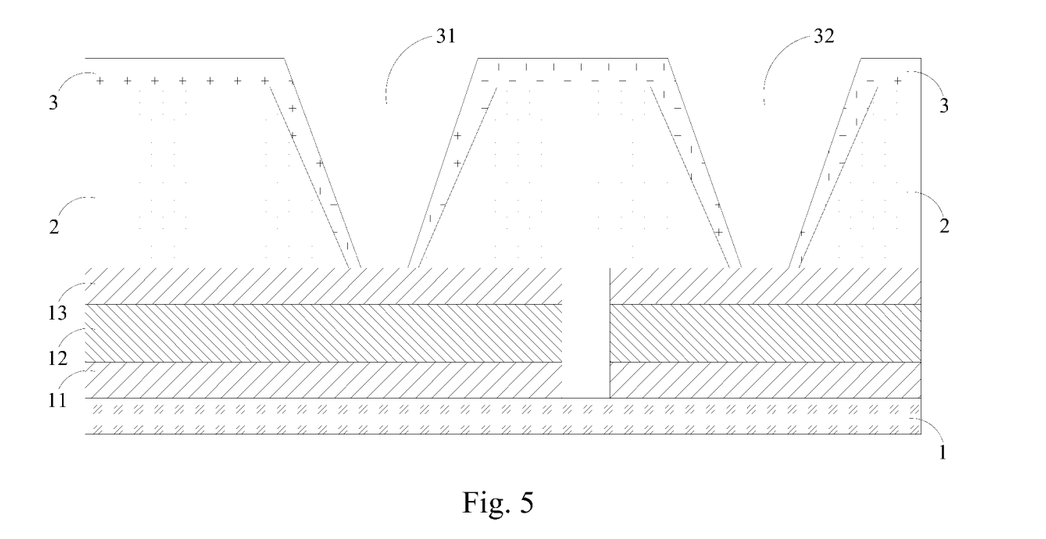
FIG. 5 is a schematic structural diagram after forming a first passivation layer on the basis of FIG. 4.

Optionally in the array substrate according to the embodiment of this disclosure, as illustrated in FIG. 2 and FIG. 5, the array substrate further includes: a first passivation layer 3 located between the touch electrode 6 and the planarization layer 2, where the first passivation layer 3 includes at least one second touch electrode contact hole 31.

The area of the orthographic projection of the second touch electrode contact hole 31 on the base substrate 1 is smaller than the area of the orthographic projection of the first touch electrode contact hole 21 (as illustrated in FIG. 4) on the base substrate 1.

The touch electrode 6 is connected with the first conductive layer 12 through the first touch electrode contact hole 21, the second touch electrode contact hole 31, and the first via hole 4.

Optionally in the array substrate according to the embodiment of this disclosure, as illustrated in FIG. 2 and FIG. 5, the first passivation layer 3 further includes at least one second pixel electrode contact hole 32.

The area of the orthographic projection of the second pixel electrode contact hole 32 on the base substrate 1 is smaller than the area of the orthographic projection of the first pixel electrode contact hole 22 (as illustrated in FIG. 4) on the base substrate 1.

The pixel electrode 6 is connected with the touch electrode block 7 through the first pixel electrode contact hole 22, the second pixel electrode contact hole 32, and the second via hole 5.

Specifically in the array substrate according to the embodiment of this disclosure, as illustrated in FIG. 5, the first passivation layer 3 is arranged on the planarization layer 2, that is, arranged between the touch electrode 6 and the planarization layer 2, the first passivation layer 3 has the second touch electrode contact hole 31 and the second pixel electrode contact hole 32, and the first passivation layer 3 can cover sidewalls in the first touch electrode contact hole and the first pixel electrode contact hole. The area of the orthographic projection of the second touch electrode contact hole on the base substrate is smaller than the area of the orthographic projection of the first touch electrode contact hole on the base substrate, and the second touch electrode contact hole and the first touch electrode contact hole are arranged coaxially; and the area of the orthographic projection of the second pixel electrode contact hole on the base substrate is smaller than the area of the orthographic projection of the first pixel electrode contact hole on the base substrate, and the second pixel electrode contact hole and the first pixel electrode contact hole are arranged coaxially.

The first passivation layer 3 can protect the planarization layer 2 to thereby avoid the planarization layer 2 from being damaged while the second conductive layer 13 is being subsequently etched, and can prevent the exposed planarization layer 2 from contaminating a chamber while the touch electrode 6 are being subsequently plated. In the embodiment of this disclosure, the first passivation layer 3 can be an inorganic insulation film, e.g., silicon nitride, silicon oxide, etc., or an organic insulation film, e.g., a resin material. Of course, the first passivation layer 3 may not be arranged. The planarization layer 2 can be arranged for planarization and insulation.

Figure 6:
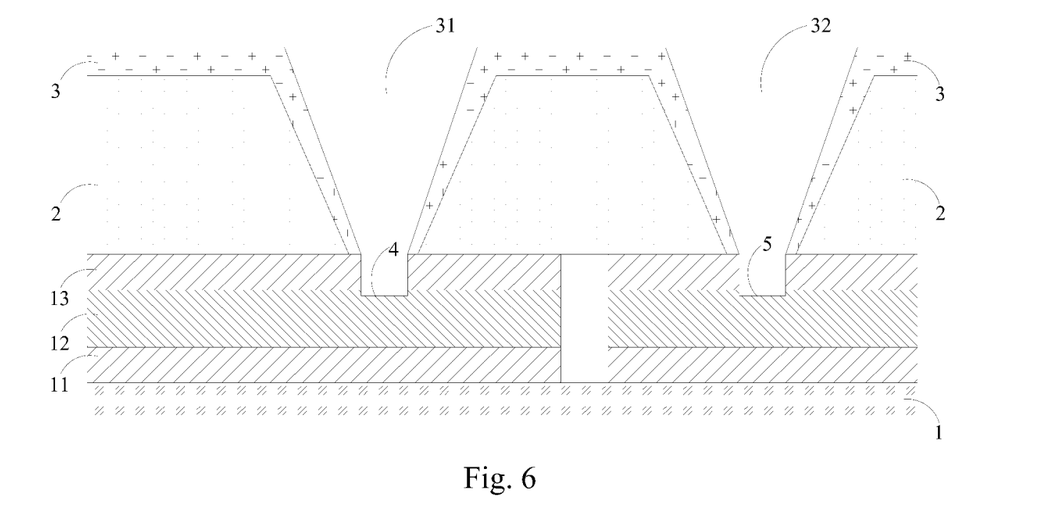
FIG. 6 is a schematic structural diagram after forming a first via hole and a second via hole on the basis of FIG. 5.

Specifically in the array substrate according to the embodiment of this disclosure, as illustrated in FIG. 6, after the first passivation layer 3 is formed, the second conductive layer 13 can be etched in position corresponding to the second touch electrode contact hole 31 and the second pixel electrode contact hole 32 respectively to form the first via hole 4 and the second via hole 5 to thereby avoid the planarization layer from being affected in an etching process.

The position and the size of the orthographic projection of the first via hole 4 on the base substrate 1 are substantially the same as the position and the size of the orthographic projection of the second touch electrode contact hole 31 on the base substrate 1, and the position and the size of the orthographic projection of the second via hole 5 on the base substrate 1 are substantially the same as the position and the size of the orthographic projection of the second pixel electrode contact hole 32 on the base substrate 1.

It shall be noted that in the array substrate according to the embodiment of this disclosure, the first via hole 4 and the second via hole 5 can be formed in the same photolithograph process. The first via hole 4 and the second via hole 5 can be formed by only removing the second conductive layer 13 on the first conductive layer 12 to thereby expose the first conductive layer 12; and in order to enable the touch electrode 6 to be in good contact with the first conductive layer 12, after the second conductive layer 13 is removed, a part of the first conductive layer 12 can also be removed to thereby avoid the remaining second conductive layer 13 from affecting the contact between the touch electrode 6 and the first conductive layer 12. Accordingly the second conductive layer 13 can be removed by a thickness more than or equal to the thickness of the second conductive layer 13.

Figure 7:
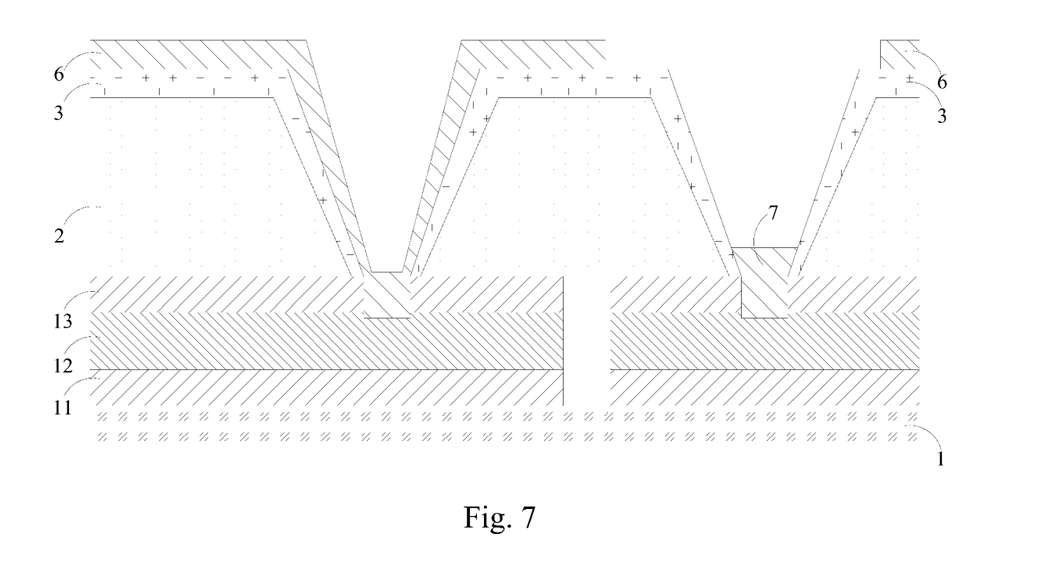
FIG. 7 is a schematic structural diagram after forming touch electrode and touch electrode block on the basis of FIG. 6.

Optionally in the array substrate according to the embodiment of this disclosure, as illustrated in FIG. 7, the array substrate further includes a touch electrode block 7 at least located in the second via hole.

The touch electrode block 7 is arranged at the same layer as the touch electrode 6.

Specifically in the array substrate according to the embodiment of this disclosure, as illustrated in FIG. 7, the touch electrode 6 can be arranged on the first passivation layer 3, and the touch electrode 6 can be connected with the first via hole 4 through the first touch electrode contact hole 21 and the second touch electrode contact hole 31. The touch electrode block 7 is arranged on the second via hole 5. The touch electrode 6 and the touch electrode block 7 can be formed in the same evaporation, spraying, and other processes without any additional process flow. The touch electrode block 7 can protect the second via hole 5 of the first conductive layer 12 to thereby avoid the second via hole 5 from being oxidized while being exposed for a long time period, and thus affecting electrical conduction between the first conductive layer 12 and the pixel electrode.

Moreover when the first passivation layer 3 is not arranged, the touch electrode 6 can be arranged directly on the planarization layer 2, and connected with the first via hole 4 only through the first touch electrode contact hole 21.

Figure 8:
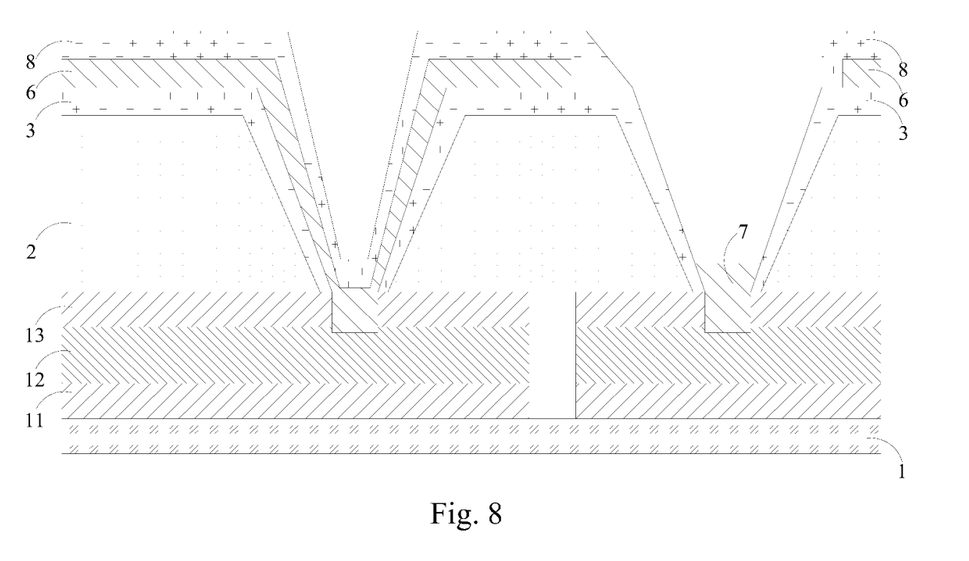
FIG. 8 is a schematic structural diagram after forming a second passivation layer on the basis of FIG. 7.

Optionally in the array substrate according to the embodiment of this disclosure, as illustrated in FIG. 2 and FIG. 8, the array substrate further includes a second passivation layer 8 located between the touch electrode 6 and the pixel electrode 9.

The orthographic projection of the second passivation layer 8 on the base substrate 1 does not overlap with orthographic projection of the first pixel contact hole 22 (as illustrated in FIG. 4) on the base substrate 1.

Specifically in the array substrate according to the embodiment of this disclosure, as illustrated in FIG. 8, the second passivation layer 8 is arranged on the touch electrode 6. The second passivation layer 8 is not arranged on the touch electrode block 7. The second passivation layer 8 can protect the touch electrode 6, and insulate the touch electrode 6 from the outside. The second passivation layer 8 can be an inorganic insulation film, e.g., silicon oxide, silicon oxide, etc., or an organic insulation film, e.g., a resin material.

Specifically in the array substrate according to the embodiment of this disclosure, as illustrated in FIG. 2 which is a schematic structural diagram after the pixel electrode 9 are is formed further to FIG. 8, the pixel electrode 9 is arranged on the second passivation layer 8, and the pixel electrode 9 can be connected with the touch electrode block 7 through the first pixel electrode contact hole 22 and the second pixel electrode contact hole 32. The touch electrode block 7 can connect the pixel electrode 9 with the first conductive layer 2 to perform a display function in the display period. Of course, when the first passivation layer 3 is not arranged, the pixel electrode 9 can be connected with the touch electrode block 7 only through the first pixel electrode contact hole 22.

A flow of fabricating the array substrate will be described below in connection with the schematic structural diagrams of the array substrate as illustrated in FIG. 2 to FIG. 8.

As illustrated in FIG. 3, a base substrate 1 is prepared, and touch electrode wiring is formed on the base substrate 1, where the touch electrode wiring include a third conductive layer 11, a first conductive layer 12, and a second conductive layer 13 stacked over each other.

As illustrated in FIG. 4, a planarization layer 2 is formed on the side of the second conductive layer 13 away from the base substrate 1, and first touch electrode contact hole 21 and first pixel electrode contact hole 22 are formed in one patterning process.

As illustrated in FIG. 5, a first passivation layer 3 is formed on the side of the planarization layer 2 away from the base substrate 1, and first touch electrode contact hole 31 and second pixel electrode contact hole 32 are formed in position corresponding to the first touch electrode contact hole 21 and the first pixel electrode contact hole 22 respectively.

As illustrated in FIG. 6, first via hole 4 and second via hole 5 are formed in the second conductive layer 13 in one patterning process at positions defined by the first touch electrode contact hole 31 and the second pixel electrode contact hole 32.

As illustrated in FIG. 7, the touch electrode 6 is formed on the side of the first passivation layer 3 away from the base substrate 1, and touch electrode block 7 is formed in the second via hole, in one patterning process.

As illustrated in FIG. 8, a second passivation layer 8 is formed on the side of the touch electrode 6 away from the base substrate 1, where the orthographic projection of the second passivation layer 8 on the base substrate 1 does not overlap with the orthographic projection of the first pixel electrode contact hole on the base substrate 1.

As illustrated in FIG. 2, the pixel electrode 9 is formed on the side of the second passivation layer 8 away from the base substrate 1 in a pixel area, where the pixel electrode 9 contacts with the touch electrode block 7.

Based upon the same inventive idea, an embodiment of this disclosure further provides a display device which can include the array substrate above. The structure of the array substrate has been described above in details, so a repeated description thereof will be omitted here.

Figure 9:
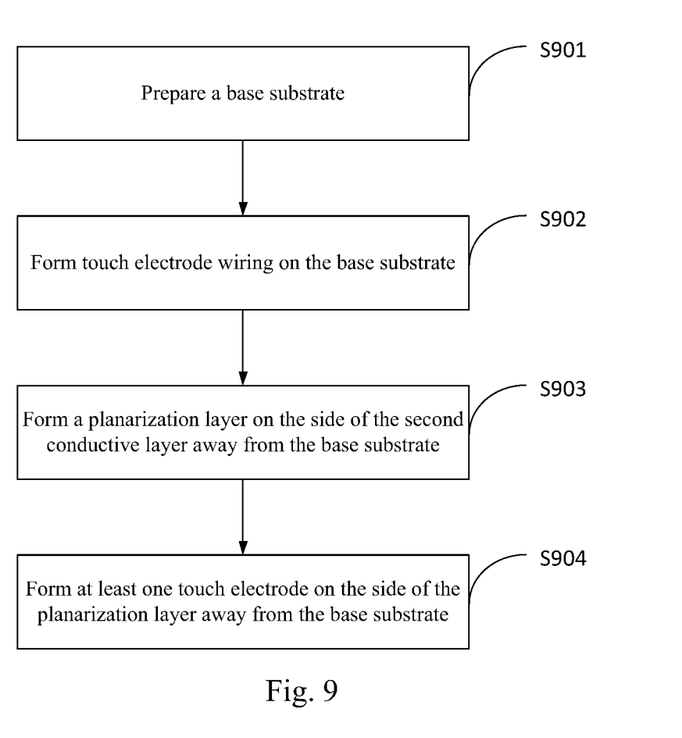
FIG. 9 is a flow chart of a method for fabricating an array substrate according to an embodiment of this disclosure.

Based upon the same inventive idea, an embodiment of this disclosure further provides a method for fabricating the array substrate above. As illustrated in FIG. 9 which is a flow chart of a method for fabricating an array substrate according to an embodiment of this disclosure, the method for fabricating an array substrate can include the following steps.

The step S901 is to prepare a base substrate.

The step S902 is to form touch electrode wiring on the base substrate, the touch electrode wiring including a first conductive layer and a second conductive layer, where the first conductive layer is located between the base substrate and the second conductive layer, the second conductive layer includes at least one first via hole to expose the first conductive layer, and the first conductive layer has a higher electrical conductivity than that of the second conductive layer.

The step S903 is to form a planarization layer on the side of the second conductive layer away from the base substrate, where the planarization layer includes at least one first touch electrode contact hole, and the orthographic projection of the first touch electrode contact hole on the base substrate covers the orthographic projection of the first via hole on the base substrate.

The step S904 is to form at least one touch electrode on the side of the planarization layer away from the base substrate, where the touch electrode is connected with the first conductive layer through the first touch electrode contact hole and the first via hole.

Optionally in the method for fabricating an array substrate according to the embodiment of this disclosure, before the touch electrode is formed, the fabricating method further includes: forming a first passivation layer on the side of the planarization layer away from the base substrate. The first passivation layer includes second touch electrode contact hole. The area of the orthographic projection of the second touch electrode contact hole on the base substrate is smaller than the area of the orthographic projection of the first touch electrode contact hole on the base substrate; and the touch electrode is connected with the first conductive layer through the first touch electrode contact hole, the second touch electrode contact hole, and the first via hole.

Optionally in the method for fabricating an array substrate according to the embodiment of this disclosure, after the first touch electrode contact hole is formed, the fabricating method further includes: removing the second conductive layer in position corresponding to the first touch electrode contact hole to form the first via hole to expose the first conductive layer.

Optionally in the method for fabricating an array substrate according to the embodiment of this disclosure, when the first touch electrode contact hole is formed in the planarization layer, the fabricating method further includes: forming first pixel electrode contact hole in the planarization layer in the same patterning process as the first touch electrode contact hole.

Optionally in the method for fabricating an array substrate according to the embodiment of this disclosure, after the first pixel electrode contact hole is formed, the fabricating method further includes: removing the second conductive layer in position corresponding to the first pixel electrode contact hole to form second via hole to expose the first conductive layer.

Optionally in the method for fabricating an array substrate according to the embodiment of this disclosure, when the touch electrode is formed on the side of the planarization layer away from the base substrate, the fabricating method further includes: forming the touch electrode block in the second via hole in the same patterning process as the touch electrode.

Optionally in the method for fabricating an array substrate according to the embodiment of this disclosure, after the touch electrode is formed on the side of the planarization layer away from the base substrate, the fabricating method further includes: forming a second passivation layer on the side of the touch electrode away from the base substrate, where the orthographic projection of the second passivation layer on the base substrate does not overlap with the orthographic projection of the first pixel contact hole on the base substrate.

Optionally in the method for fabricating an array substrate according to the embodiment of this disclosure, after the second passivation layer is formed on the side of the touch electrode away from the base substrate, the fabricating method further includes: forming at least one pixel electrode on the side of the second passivation layer away from the base substrate, where the pixel electrode is connected with the touch electrode block through the first pixel electrode contact hole.

Moreover although the respective steps in the method according to the embodiment of this disclosure have been described with reference to the drawings in a specific order, this shall not require or suggest that these steps be performed in that specific order, or all the steps be performed for a desirable effect. Additionally or alternatively, some steps may be omitted, more than one of the steps may be performed in one step, and/or one of the steps may be performed in a plurality of steps.

Details about the respective steps in the method above for fabricating an array substrate have been set forth in detail, so a repeated description thereof will be omitted here.

In summary, in the array substrate, the method for fabricating the same, and the display device according to the embodiments of this disclosure, the array substrate includes: a base substrate; touch electrode wiring including a first conductive layer and a second conductive layer, where the first conductive layer is located between the base substrate and the second conductive layer, the second conductive layer includes at least one first via hole to expose the first conductive layer, and the first conductive layer has a higher electrical conductivity than that of the second conductive layer; a planarization layer located on the side of the second conductive layer away from the base substrate, where the planarization layer includes at least one first touch electrode contact hole, and an orthographic projection of the first touch electrode contact hole on the base substrate covers the orthographic projection of the first via hole on the base substrate; and at least one touch electrode located on the side of the planarization layer away from the base substrate, where the touch electrode is connected with the first conductive layer through the first touch electrode contact hole and the first via hole. In the structure of the array substrate above, the touch electrode can directly contact with the first conductive layer, and since the first conductive layer has a higher electrical conductivity than that of the second conductive layer, the touch electrode can directly contact with the first conductive layer to thereby lower a contact resistance between the touch electrode and the first conductive layer so as to avoid in effect a touch panel from being stuck, a poor touch from occurring, etc., in a touch period. Moreover the contact resistance can be lowered to thereby alleviate heat from being generated in the touch panel, so as to prolong the lifetime of the product, to save energy, and to reduce contamination emission.

Although a relative relationship of one component to another in the drawings has been described using a relativity expression, e.g., "on", in this context, such expression has been used in this context only for the sake of convenience, for example, in connection with a direction in an example illustrated in the drawings. As can be appreciated, if the structure as illustrated is inverted, then the component located "on" the other component will be a component located "below" the other component. When some structure is "on" another structure, the structure may be formed on and integral to the other structure, or may be arranged "directly" on the other structure, or may be arranged "indirectly" on the other structure through still another structure.

In this context, the terms "one", "a/an", "the", etc., represent the presence of one or more elements, components, etc., the terms "include", "comprise", "have", etc., represent open inclusion, and do not preclude another or other elements, components, etc., in addition to listed elements, components, etc., and the terms "first", "second", etc., only refer to different elements, components, etc., but shall not limit their numbers.

Other embodiments of this disclosure shall readily occur to those skilled in the art upon considering the specification, and practicing this disclosure as described here. This disclosure is intended to encompass any variations, uses, or adaptations of this disclosure, and all these variations, uses, or adaptations shall comply with the general principle of this disclosure, and encompass well-known knowledge or common technical means in the prior at although they may not have been described in this disclosure. The description and the embodiments are only illustrative of this disclosure, but the true scope and spirit of this disclosure shall be as defined in the appended claims.

The invention claimed is:

1. An array substrate, comprising:
   a base substrate;
   touch electrode wiring comprising a first conductive layer and a second conductive layer, wherein the first conductive layer is between the base substrate and the second conductive layer, the second conductive layer comprises at least one first via hole to expose the first conductive layer, and the first conductive layer has a higher electrical conductivity than that of the second conductive layer;
   a planarization layer on a side of the second conductive layer away from the base substrate, wherein the planarization layer comprises at least one first touch electrode contact hole, and an orthographic projection of the first touch electrode contact hole on the base substrate covers an orthographic projection of the first via hole on the base substrate; and
   at least one touch electrode on a side of the planarization layer away from the base substrate, wherein the touch electrode is connected with the first conductive layer through the first touch electrode contact hole and the first via hole.

2. The array substrate according to claim 1, wherein the first conductive layer comprises at least one groove,
wherein an orthographic projection of the groove on the base substrate overlaps with the orthographic projection of the first via hole on the base substrate.

3. The array substrate according to claim 1, further comprising:
a first passivation layer between the touch electrode and the planarization layer, wherein the first passivation layer comprises at least one second touch electrode contact hole;
an area of an orthographic projection of the second touch electrode contact hole on the base substrate is smaller than an area of the orthographic projection of the first touch electrode contact hole on the base substrate; and
the touch electrode is connected with the first conductive layer through the first touch electrode contact hole, the second touch electrode contact hole, and the first via hole.

4. The array substrate according to claim 3, further comprising: at least one driver transistor for driving at least one pixel electrode, wherein:
the touch electrode wiring is arranged at a same layer as the driver transistor and insulated from source and drain electrodes of the driver transistor.

5. The array substrate according to claim 4, wherein the second conductive layer further comprises at least one second via hole, and the planarization layer further comprises at least one first pixel electrode contact hole, wherein:
an orthographic projection of the first pixel electrode contact hole on the base substrate covers an orthographic projection of the second via hole on the base substrate.

6. The array substrate according to claim 5, further comprising: at least one touch electrode block at least located in the at least one second via hole, wherein:
the touch electrode block is arranged at a same layer as the touch electrode.

7. The array substrate according to claim 6, wherein the first passivation layer further comprises at least one second pixel electrode contact hole, wherein:
an area of an orthographic projection of the second pixel electrode contact hole on the base substrate is smaller than an area of the orthographic projection of the first pixel electrode contact hole on the base substrate; and
the pixel electrode is connected with the touch electrode block through the first pixel electrode contact hole, the second pixel electrode contact hole, and the second via hole.

8. The array substrate according to claim 6, further comprising a second passivation layer between the touch electrode and the pixel electrode, wherein:
an orthographic projection of the second passivation layer on the base substrate does not overlap with the orthographic projection of the first pixel electrode contact hole on the base substrate.

9. A display device, comprising the array substrate according to claim 1.

10. A method for fabricating an array substrate, comprising:
preparing a base substrate;
forming touch electrode wiring on the base substrate, the touch electrode wiring comprising a first conductive layer and a second conductive layer, wherein the first conductive layer is between the base substrate and the second conductive layer, the second conductive layer comprises at least one first via hole to expose the first conductive layer, and the first conductive layer has a higher electrical conductivity than that of the second conductive layer;
forming a planarization layer on a side of the second conductive layer away from the base substrate, wherein the planarization layer comprises at least one first touch electrode contact hole, and an orthographic projection of the first touch electrode contact hole on the base substrate covers an orthographic projection of the first via hole on the base substrate; and
forming at least one touch electrode on a side of the planarization layer away from the base substrate, wherein the touch electrode is connected with the first conductive layer through the first touch electrode contact hole and the first via hole.

11. The method according to claim 10, wherein before the touch electrode is formed, the method further comprises:
forming a first passivation layer on the side of the planarization layer away from the base substrate, wherein:
the first passivation layer comprises at least one second touch electrode contact hole;
an area of an orthographic projections of the second touch electrode contact hole on the base substrate is smaller than an area of an orthographic projection of the first touch electrode contact hole on the base substrate; and
the touch electrode is connected with the first conductive layer through the first touch electrode contact hole, the second touch electrode contact hole, and the first via hole.

12. The method according to claim 10, wherein after the first touch electrode contact hole is formed, the method further comprises:
removing the second conductive layer in position corresponding to the first touch electrode contact hole to form the first via hole to expose the first conductive layer.

13. The method according to claim 10, wherein when the first touch electrode contact hole is formed in the planarization layer, the method further comprises:
forming at least one first pixel electrode contact hole in the planarization layer in a same patterning process as the first touch electrode contact hole.

14. The method according to claim 13, wherein after the first pixel electrode contact hole is formed, the method further comprises:
removing the second conductive layer in position corresponding to the first pixel electrode contact hole to form second via hole to expose the first conductive layer.

15. The method according to claim 14, wherein when the touch electrode is formed on the side of the planarization layer away from the base substrate, the method further comprises:
forming a touch electrode block in the second via hole in a same patterning process as the touch electrode.

16. The method according to claim 15, wherein after the touch electrode is formed on the side of the planarization layer away from the base substrate, the method further comprises:
forming a second passivation layer on a side of the touch electrode away from the base substrate, wherein an orthographic projection of the second passivation layer on the base substrate does not overlap with the orthographic projection of the first pixel electrode contact hole on the base substrate.

17. The method according to claim 16, wherein after the second passivation layer is formed on the side of the touch electrode away from the base substrate, the method further comprises:

forming at least one pixel electrode on a side of the second passivation layer away from the base substrate, wherein the pixel electrode is connected with the touch electrode block through the first pixel electrode contact hole.

* * * * *